(12) United States Patent
Giuseppini

(10) Patent No.: US 8,095,912 B2
(45) Date of Patent: Jan. 10, 2012

(54) TESTING A CONTEXT-FREE LANGUAGE COMPILER

(75) Inventor: Gabriele Giuseppini, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1642 days.

(21) Appl. No.: 11/245,326

(22) Filed: Oct. 6, 2005

(65) Prior Publication Data

US 2007/0083360 A1 Apr. 12, 2007

(51) Int. Cl.
*G06F 9/44* (2006.01)
(52) U.S. Cl. ........... 717/124; 717/126; 714/38; 714/715
(58) Field of Classification Search .................. 717/124, 717/126; 714/38, 715
See application file for complete search history.

(56) References Cited

U.S. PATENT DOCUMENTS

| | | | | |
|---|---|---|---|---|
| 4,729,096 | A * | 3/1988 | Larson | 717/126 |
| 5,255,385 | A * | 10/1993 | Kikuchi | 714/25 |
| 5,754,860 | A * | 5/1998 | McKeeman et al. | 717/124 |
| 6,223,337 | B1 * | 4/2001 | Blume | 717/126 |
| 6,333,999 | B1 * | 12/2001 | Brownsmith | 382/229 |
| 7,152,227 | B1 * | 12/2006 | Bloom | 717/143 |
| 7,363,614 | B2 * | 4/2008 | Kageyama et al. | 717/124 |

OTHER PUBLICATIONS

Markus Freericks, "The nML Machine Description Formalism" 1993, 1-45 pages.*
Boujarwah, K. Saleh "Compiler test case generation methods: a survey and assessment", 1997, pp. 617-625.*
Knuth, "Semantics of Context-Free Language", 1968, Springer-Verlang New York Inc., vol. 2, No. 2, pp. 127-145.*
Hanford, "Automatic Generation of test cases", 1970, IEEE, pp. 242-257.*

* cited by examiner

*Primary Examiner* — Phillip Nguyen
(74) *Attorney, Agent, or Firm* — Wolf, Greenfield & Sacks, P.C.

(57) ABSTRACT

Systems and methods for testing a context-free language compiler. Given a description of a context-free grammar including a set of production rules, a test component applies the grammar description to generate one or more valid test strings of terminal symbols. A value generation component may replace one or more terminal symbols in the set of test strings with values appropriate for the class of the terminal symbol. The resulting set of test strings may be individually applied to a compiler, which returns a response based upon the applied test string that may be used to determine if the compiler is operating as expected. The set of test strings may be generated using every production rule of the given context-free grammar description. In addition to valid test strings, a set of invalid test strings may be generated by making use of a set of invalid production rules while generating test strings.

20 Claims, 4 Drawing Sheets

901 <function_call> ::= SomeFunction(<value_expression>)

902 <function_call> ::= SomeFunction(<value_expression> {0_TO_100})

TESTING A CONTEXT-FREE LANGUAGE COMPILER

BACKGROUND

Many languages, including most programming languages, are context-free languages. These languages have properties that lend themselves to efficient computational methods such as determining if a string of characters is a valid string in the context-free language. These methods are most typically performed by context-free language compilers which read a string, determine if the string is valid for a given context-free language, determine the implicit structure conveyed by the string, and perform one or more actions as a result of the determined structure. As is the case with most practical systems, however, complexity bears down on the task of developing context-free language compilers.

Even simple context-free languages may describe an infinite number of valid strings and confuse even experienced computer scientists. For context-free languages described by complex grammars, the number of production rules can easily number in the hundreds or thousands. As with any human-engineered system, especially those coping with massive complexity, extensive testing is necessary to ensure proper operational behavior. Because compilers for programming languages are used to generate object code for a great variety of applications, including those for which the safety of humans is at stake, it is even more critical that they be tested as thoroughly and accurately as possible.

SUMMARY

A grammar description containing one or more production rules is, at least in part, used to generate a set of one or more terminal strings comprising one or more instances of terminal symbols from the grammar description. A set of one or more test strings is generated by replacing one or more of the instances of terminal symbols in the set of generated terminal strings with values. Each test string may then be applied to a compiler, which returns a response based upon the test string. Each response may then be compared against an expected response for the test string to determine if the compiler is operating as expected.

In other aspects of the present invention, additional options may be specified which impact the generation of the set of terminal strings. In an aspect of the present invention, the set of terminal strings is generated using every production rule in the grammar description at least once. In another aspect of the present invention, a set of invalid production rules may also be read and used to generate invalid strings. In yet another aspect of the present invention, the grammar description may contain flags which influence the values used to replace instances of terminal symbols in the terminal strings.

BRIEF DESCRIPTIONS OF THE DRAWINGS

DETAILED DESCRIPTION

Current methods for testing compilers rely upon the generation of great numbers of test cases by human test authors. Each test case expresses a string which is valid (and should be recognized to be valid by the compiler) or invalid (and should be rejected by the compiler, preferably with an accurate suggestion as to why the string is invalid). The writing of test cases by human test authors, however, is prone to a great many problems. First, it is difficult to ensure that every production rule has been covered by the resulting suite of test cases, particularly if many human test authors are involved. Second, it is difficult to ensure that all but the simplest of test cases are even accurate as human error could lead to a string which is intended to be valid but is, in fact, invalid (or vice versa). Third, the amount of time and associated cost necessary to employ a force of human testers to author test cases for a compiler is typically very high. Finally, what makes each of these factors worse is that the grammar supported by a context-free language compiler may be in flux, especially in the critical period where the early versions are being developed and tested. This means that the time, costs, and risks of relying on human authored test cases are greatly multiplied during one of the most critical periods in the development of a context-free language compiler. Having recognized these limitations of the current method of testing a context-free language compiler, the Inventor has identified a need for improved systems and methods for testing a context-free language compiler. The present invention is therefore directed to systems and methods for testing a context-free language compiler, in part, by making use of a description of a grammar for a context-free language to generate a set of one or more strings for testing the operation of the compiler.

As used herein, a "character" is the fundamental constituent of a string. The union of every possible combination of characters (allowing for repetition of characters) within a given set of characters defines an infinitely large set of finite-length string instances (provided the length of a string is not limited). Context-free languages are sets of strings defined using a finite set of distinct characters, but restricted in a particular manner which will be described later. The size of the set of strings defining a particular context-free language is typically far smaller than the size of the set of all possible strings defined by all combinations of the given set of characters.

Figure 1:
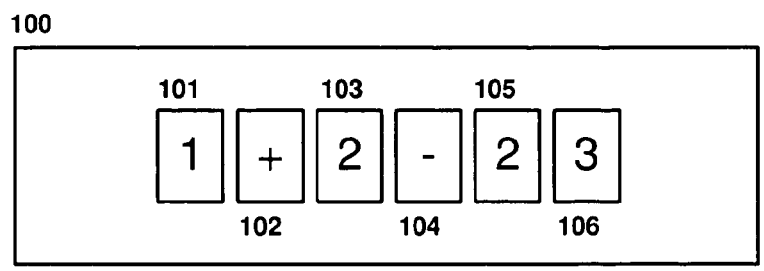
FIG. 1 illustrates the composition of a simple string.

FIG. 1 illustrates an example of a string "1+2−23" 100 comprising characters "1" 101, "+" 102, "2" 103, "−" 104, "2" 105, and "3" 106 selected from a set minimally comprising the characters: "1", "2", "3", "+", and "−". The string 100 may be a member of the set of strings described by one or more context free-languages. Though the characters "2" 105 and "3" 106 are two individual characters, they also have significance when combined to form a logical unit "23". Such a unit is herein referred to as a "token" and represents a grouping of one or more characters. As part of a lexical analysis, a string may be "tokenized" according to a set of provided tokenization rules.

When representing the string 100 in a hypothetical context-free language expressing arithmetic, there may be 5 tokens: "1", "+", "2", "−", and "23". The tokens "1", "2", and "23" may also have significance that differs from that of the tokens "+" and "−". We would also recognize that the tokens "1", "2", and "23" are similar to each other in that they all describe numbers. The tokens "1", "2", and "23" therefore are syntactically equivalent and each are instances of a same, broader class of tokens. Tokens which are instances of a broader class may be replaced by a more general token.

After each token of the string 100 that is an instance of a broader class of tokens has been replaced by a more general token representing the token class, the resulting tokens are referred to as "terminal symbols".

Figure 2:
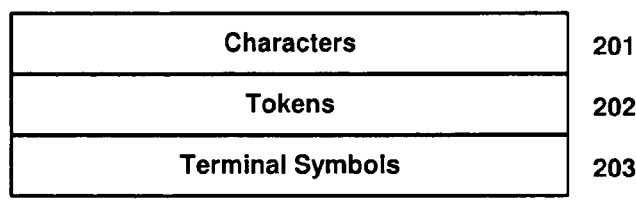
FIG. 2 illustrates the relationship between characters, tokens, and terminal symbols.
Figure 3:
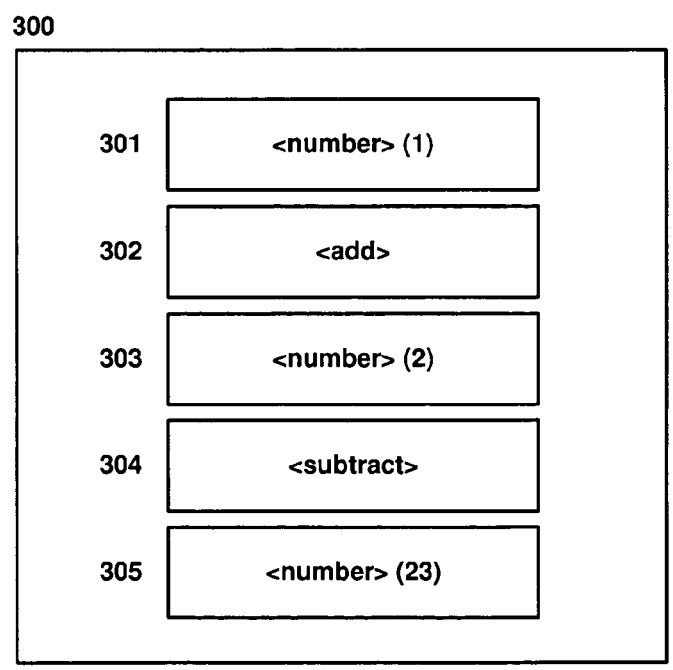
FIG. 3 illustrates the result of performing lexical analysis on the string of FIG. 1.

FIG. 2 illustrates the hierarchy of string characters, tokens, and terminal symbols as described herein. A string comprises characters selected from a finite set of characters, as illustrated in FIG. 1. Once tokens 202 have been generated from the characters 201 in the string instance, the tokens 202 may be generalized into terminal symbols 203. FIG. 3 illustrates the result 300 of generalizing the tokens resulting from the string illustrated in FIG. 1 to their respective terminal symbols. As disclosed earlier, for the example of a context-free language representing basic arithmetic, five tokens 301, 302, 303, 304, 305, and 306 result from the original string instance of six characters illustrated in FIG. 1.

The tokens 301, 303, and 305 are the result of generalizing the tokens "1", "2", and "23" as well as "+" and "−" to their corresponding terminal symbols. The values of the numbers may also be kept for further use, as indicated by the numerical values shown in parenthesis. Thus, we obtain a new string: "<number><add><number><subtract><number>" which is more general than the original string. The process of generalizing strings in this manner is herein called lexical analysis. While the process of lexical analysis helps to generalize some strings, it does not determine if a string belongs to a given context-free language.

Figure 4:
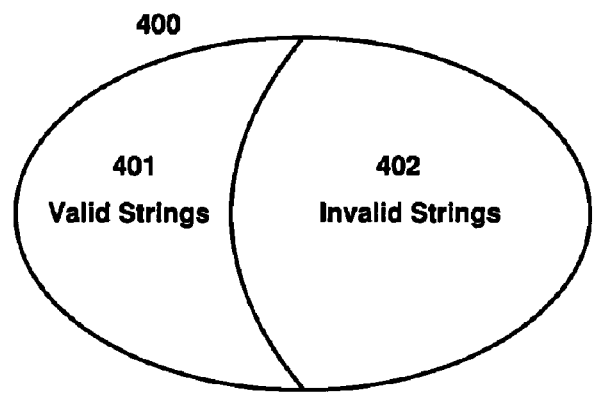
FIG. 4 illustrates the set relationships of all strings realizable from a finite set of character the set of valid strings for a context-free language, and the set of invalid strings for a context-free language.

It is now discussed how context-free languages are defined and described. A finite set of "production rules" collectively define a grammar describing the context-free language. The grammar indicates how symbols may be combined to form strings belonging to the context-free language. FIG. 4 illustrates the set of all strings 400 that may be generated from a given set of symbols. Strings belonging to the context-free language may be referred to herein as "valid" or "legal" strings 401. Symbols combined in a manner not described by the grammar form strings that are not members of the set of strings defining the context-free language and may be referred to herein as "invalid" or "illegal" strings 402.

Figure 5:
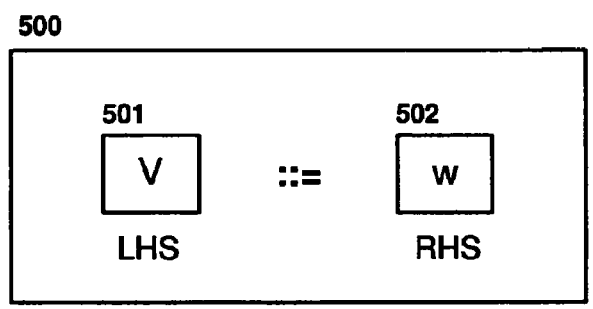
FIG. 5 illustrates the format of a general production rule for a context-free language expressed using BNF notation.

FIG. 5 illustrates the general form of a production rule 500 expressed in Backus-Naur Form ("BNF"). BNF is a notation frequently used to express the production rules of context-free grammars and will be used exclusively herein when the production rules are illustrated. It is recognized that other notations for representing a context-free grammar may be used and it is intended that the Inventor's decision to use BNF notation for expressing production rules in any examples herein not be viewed as limiting the scope of the invention to grammars expressed using BNF notation.

The production rule 500 comprises a left-hand side ("LHS") 501 and a right-hand side ("RHS") 502. This terminology is broadly used and describes the relative locations of each component of a production rule when the production rule is expressed using BNF notation. It is understood that when using other notations, the LHS and RHS may not physically correspond to the left-hand side and right-hand side of the production rule but may still be used abstractly according to the properties of the symbols appearing on the LHS and RHS described herein.

A grammar comprises two disjoint sets of symbols: non-terminal symbols and terminal symbols. Non-terminal symbols do not appear in valid strings of the context-free language. All non-terminal symbols appear on the LHS of at least one production rule. Terminal symbols, however, only appear on the RHS of any production rule and never on the LHS in a context-free grammar. The LHS of a production rule contains a single non-terminal symbol and the RHS of a production rule may comprise a combination of terminal and non-terminal symbols or may be left empty. Therefore, "V" represents any non-terminal symbol and "w" may represents a combination of zero or more terminal and non-terminal symbols. The notation represents the following concept: when a "V" is present in a valid string in the context-free language, the "V" can be replaced by "w" and the resulting (usually longer) string is also a valid string in the context-free language.

Figure 6:
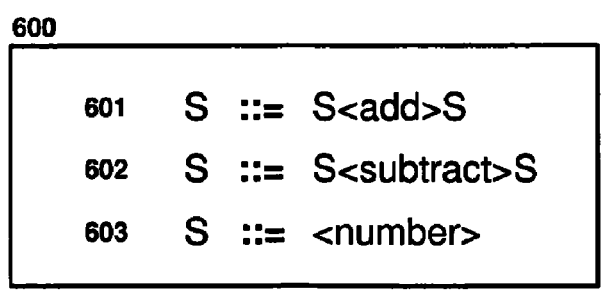
FIG. 6 illustrates a simple grammar for a context-free language expressed using BNF notation.

FIG. 6 illustrates a simple example grammar 600 for a context-free language defining strings representing basic arithmetic operations, including the strings illustrated in FIG. 1 and FIG. 3. The grammar 600 comprises three production rules 601, 602, and 603 comprising only one non-terminal symbol "S" and three terminal symbols: "<add>", "<subtract>" and "<number>". Examples of valid strings for the context-free language expressed by the grammar 600 are:
"<number><subtract><number>",
"<number><add><number>", and
"<number><subtract><number><subtract><number><add><number>". When using lexical analysis (as described earlier) to generalize stings, particular instances of the examples of valid strings provided above may include strings such as: "5−4", "7+8", "129−23−55+78".

Given a string of characters, is the string valid for a particular context-free language? As stated earlier, lexical analysis can reduce the complexity of a grammar by generalizing a string into terminal symbols, but cannot itself answer this question. A separate process is needed to do so. This process is typically called "parsing" and works by trying to efficiently find a series of production rules describing the given string of characters. Many techniques are known for efficiently parsing an input string. The processes of lexical analysis and parsing of context-free languages are performed by context-free language compilers.

Figure 7:
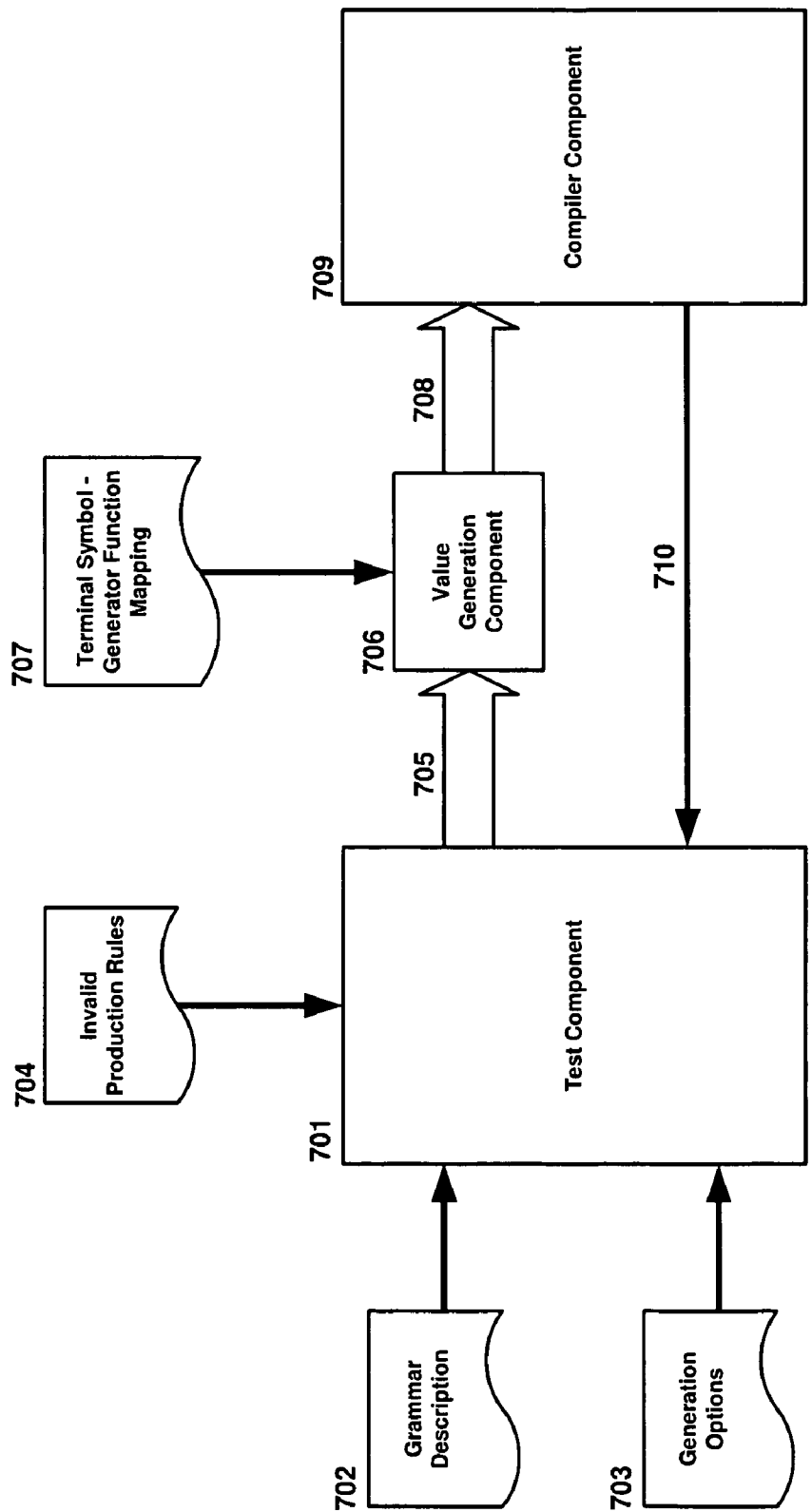
FIG. 7 is a block/functional diagram a system for testing a context-free language compiler according to some aspects of the present invention.

FIG. 7 illustrates an example system for testing a context-free language compiler according to some aspects of the present invention. A test component 701, which may, for example, be implemented as a program running on a general-purpose computer, reads a grammar description 702 of a context-free language. The grammar description 702 may be provided in BNF notation or any other notation suitable for expressing the production rules of a context-free language and may be read from any computer-readable medium.

The test component 701 may additionally read generation options 703 for directing its operation. Such options may include: the maximum desired length of a generated string, whether the generated string should be valid or invalid, and options for biasing the order and selection of production rules used to generate a string which will be described in more detail later. The generation options 703 may be read from a file stored on a computer-readable medium or passed to the test component 701 via an applications programming interface ("API").

The test component 701 may additionally read a set of invalid production rules 704 which useful for generating strings guaranteed to be invalid for the context-free language described by the grammar description 702. As with the grammar description 702, the invalid production rules 704 may be expressed using BNF notation or any other suitable notation and may be read from any computer-readable medium. The test component 701 next sends a string 705, generated using the grammar description 702 and any supplied generation options 703, to a value generation component 706. If the generation options 703 specify an invalid string should be generated, one or more of the invalid production rules 704 may be used to generate the string 705.

The string 705 comprises terminal symbols from the grammar description 702. The value generation component 706 comprises one or more value generation functions. These value generation functions can be invoked to generate a particular instance of the class of data represented by a terminal symbol from the grammar description 702. This process may be conceptualized as process operating in the opposite direction to the tokenization process described earlier. For example, for the terminal symbol "<number>" described previously, a value generation function "GenerateNumber( )" could be invoked to produce a value such as "23" to replace the terminal symbol "<number>" in the string 705. A terminal symbol—generator function mapping 707 is read by the value generation component 706 and is used to specify the particular value generation function that should be invoked to generate a value for one or more terminal symbols in the string 705. The value generation component 706 then applies a string 708 to the compiler 709. The application of the string 708 to the compiler 709 could be accomplished in a variety of ways. For example, the value generation component might save the string 708 to a file on a computer-readable medium and instantiate the compiler 709 using a dynamically generated shell command including a path to the file containing the string 708. Each generated string 708 could also be appended to a file comprising other test strings for the purpose of batching them together, along with whether they are valid or invalid strings, for later application to the compiler 709 by the test component 710, value generation component 706, or some other custom or third-party component.

The string 708 may comprise any values generated by the value generation component 706 which may have replaced one or more of the terminal symbols in the string 705. It is understood that the value generation component 706 could be constructed specifically to generate values for a particular grammar description 702 and therefore would not require a terminal symbol—generator function mapping 707. It is further recognized that the value generation component 706 could be constructed as part of the test component 701 rather than as separate components as illustrated in FIG. 7.

In the example illustrated in FIG. 7, the compiler 709, after processing a string 708 applied to it, sends a response 710 to the test component 701 indicating if the string 708 is valid or invalid for the given context-free language. The test component 701 then compares the response 710 to an expected response resulting from whether the string 705 was generated to be a valid or invalid string according to the generation options 703. The result of the comparison may then be reported in a variety of ways such as sent through an API or recorded to a file.

Figures 8, 9:
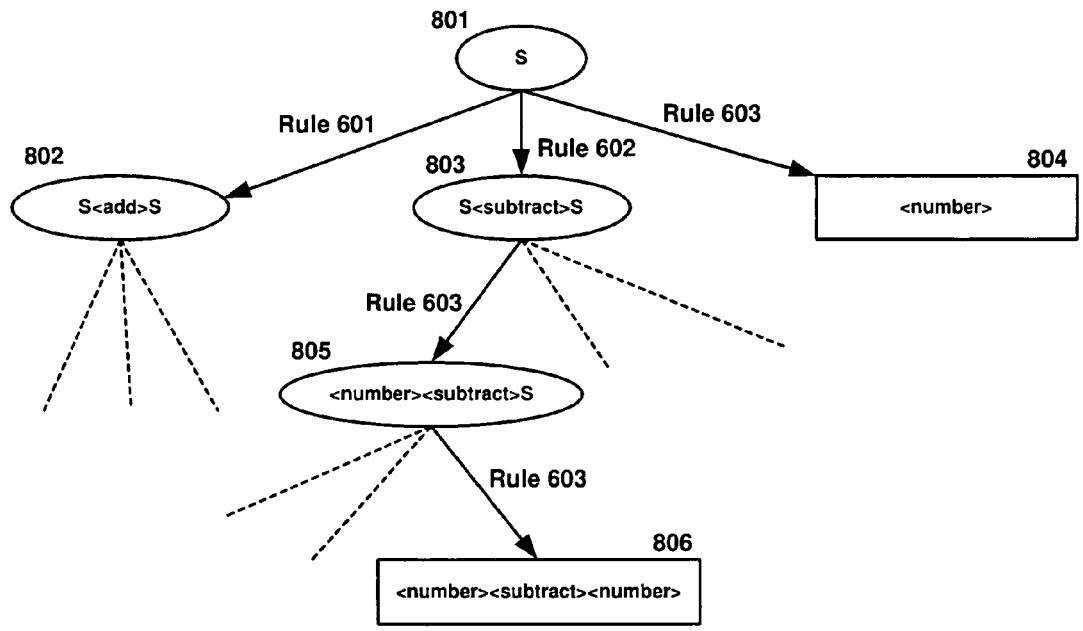
FIG. 8 illustrates part of a tree defined by the production rules of the grammar of FIG. 6.
FIG. 9 illustrates an example of how a production rule might be modified to influence the set of values generated by the value generation component of FIG. 7.

The process of generating the string 705 is accomplished by starting with what is described herein as a "start symbol" of the grammar description 702 and selecting a series of production rules from the grammar description 702 which define a string. The start symbol is a non-terminal symbol representing the root of a tree which can be constructed according to the production rules given in the grammar description 702. FIG. 8 illustrates an example of a tree described by the grammar shown in FIG. 6. The tree has node 801 as its root node and the string it represents comprises the start symbol "S". Beginning with a string composed of the start symbol "S", there are three possible replacements corresponding to the three production rules 601, 602, and 603 from FIG. 6. It is understood that the string resulting from a replacement may be a modified version of the original string or a modified version of a copy of the original string.

Node 802 of the tree represents the string "S<add>S" which results from replacing the string "S" from node 801 according to the production rule "S::=S<add>S" 601. The same holds for nodes 803 and 804. Node 804 represents the string "<number>" which comprises only a terminal symbol. This means that this string is a valid string in the context-free language described by the grammar 600 and is a candidate test string for a compiler. The strings represented by nodes 802 and 803 still comprise at least one instance of the non-terminal symbol "S" and are therefore not valid strings in the context-free language. From each node, many possible replacements can be made as indicated by the dotted lines below the nodes 802, 803, and 805. Node 805 represents a string generated by applying the production rule "S::=<number>" 603 to the leftmost instance of "S" in the string represented by node 803. After again applying the rule 603 to the string represented by node 805, we obtain the string represented by the node 806, which is a valid string in the context-free language as it no longer comprises any non-terminal symbols. Its is noted that a test string generated in this manner, using only the production rules of the grammar description for a given context-free language, is guaranteed to be a valid string for the language. Thus, it is expected that the compiler 709 recognize the validity of a string generated in this manner.

The string represented by node 804 is the product of applying only a single production rule 603, whereas the string represented by node 806 results from using two production rules 602 and 603. One of the goals of some embodiments the present invention is to generate valid test strings which cover the use of every production rule of the given grammar description. For some grammars, such as 600, it may be possible to apply every rule in the production of a single string. However, in other conceivable grammars it is not possible to generate a single string produced by the application of every production rule. Thus, it may be necessary to generate a set of strings which covers the use of every production rule rather than a single string. Furthermore, even for grammars which could support the construction of a single string produced from the application of every production rule, the resulting string would typically be very long, complicated, and take a substantial amount of time to generate. It is therefore often desirable to bias the generation of test strings in such a way to limit their length at the expense of generating more of them.

Setting a limit on the length of a generated string can be done in the generation options 703 as disclosed during the discussion of FIG. 7. To ensure that a set of strings is generated using every production rule and completed within a reasonable period of time, it may be necessary for the test component 701 to collect statistics relating to the frequency of use of each production rule for generating strings in the set. This statistical information could then be used to bias the selection of branches in a tree such as the one shown in FIG. 8 toward the application of production rules that have not yet been used in generating a test string. Such biasing may, for example, be accomplished by using probabilistic methods to select branches and "punish" (i.e., reduce the probability of selecting) branches making use of production rules which have been used already to generate test strings according to their frequency of prior use.

Additionally, other forms of bias may be introduced by the generation options 703. For example, we note that in node 803 of FIG. 8, two instances of the non-terminal symbol "S" appear: one more to the "left" of the string and one more to the "right". It is sometimes desirable to have a consistent replacement strategy for choosing the order in which to replace such non-terminal symbols. Such a strategy biases the growth of the tree toward a particular direction and can lead to different performance and results from the test component 701. Conceivable replacement strategies include "left", where the leftmost non-terminal symbol is always replaced first, "right", where the rightmost non-terminal is always replaced first, and "balanced", where the preference of replacing the leftmost and rightmost non-terminal symbol is alternated. Another biasing option that may be specified by the generation options 703 is the specification of which terminal symbols are desired to appear in the test strings. Specifying a set of desired terminal symbols may influence the order and choice of production rules used to generate the set of test strings.

It may further be desirable to support the specification of a particular search strategy in the generation options 703. Such strategies may include, for example, depth-first search and breadth-first search. Selecting a strategy such as depth-first search may be more desirable when a longer string size is preferred and, conversely, breadth-first search may be more desirable when a shorter string size is preferred. Of course, it is understood that other more exotic search strategies may be specified and implemented as well including a variety of heuristic searches.

The test component 701 can be instructed, through the use of the generation options 703 to continue generating a set of test strings until every production rule has been applied at least once and may be configured to indicate when such a set of strings has been generated. This provides a guarantee that the set of generated test strings provide complete coverage of every production rule in the grammar description 702. As disclosed previously, each generated test string may be applied to the compiler 709 as it is generated or all generated test strings can be collected together before any are applied to the compiler 709.

As mentioned earlier, in addition to generating a set of strings which are known to be valid for testing the compiler 709, it is desirable to generate a set of strings that are known to be invalid. This may be accomplished by setting an option in the generation options 703 informing the test component 701 that a set of invalid strings should be generated. One way this may be accomplished is by using the list of invalid production rules 704. For each invalid production rule, a string can be generated using the grammar description 702 and the invalid production rule. Using only one invalid production rule per generated string is not necessary, but may be desirable for the practical purpose of making it easier to track down errors in the implementation of the compiler 709 and to minimize the length of the resulting test string. The invalid production rules 704 can be constructed in such a way as to use only terminal and non-terminal symbols described in the grammar description 702. Though this is not necessary for producing invalid strings, the result of doing so is a string that may be generated by applying both the valid production rules from 702 and the selected invalid production rule from 704. Such a string; in many cases, may differ only slightly from a valid string in its appearance and may offer better testing of the edge conditions of the compiler 709.

In another aspect of the present invention, the grammar description 702 may be modified to include "flags" for influencing how particular values replacing the terminal symbols are generated by the value generation component 706. FIG. 9 illustrates an example of how such flags may be defined. The production rule 901 shows that a non-terminal symbol "<function_call>" can be replaced by "SomeFunction(<value_expression>)" in a given string. If it is known that the function "SomeFunction(numerical argument)" is only valid for a numerical argument in the range 0 to 100, and the compiler should indicate a compile-time error if it can determine that the argument ultimately resulting from the "<value_expression>" symbol. To allow for such testing, the production rule can be replaced, for example, as shown by 902, by a production rule which includes the added flag of "{0_TO_100}", indicating that only a value between 0 and 100 will lead to a valid string. The flag can then be carried through all production rules until a test string 705 is generated. The test string 705 would now comprise the flags that have accumulated from the modified grammar as well. When the value generation component 706 receives the test string 705, it passes the flags into the generation function mapped to each terminal symbol by the terminal symbol—generator function mapping 707 as arguments. The generating function may then generate only values adhering to the conditions specified by the flags appearing in the test string 705. If it is desired that invalid ranges be generated, the test component 701 may inform the value generation component 706 to pass an additional parameter to each value generation function so that they produce values explicitly not adhering to the conditions specified by the flags.

In summary, aspects of a method and system for testing a context-free language compiler have been disclosed. Using a provided grammar description, optional invalid production rules, and any special generation options, a test component generates a set of one or more test strings, optionally applying every production rule in the generation of the set of strings. Each string is known to be either valid or invalid and is sent to a value generation component, which may replace some or all of the terminal symbols in a string with values appropriate for each terminal symbol according to a provided mapping. The resulting string may then be applied to the compiler to be tested and the result compared with expected result to determine if the compiler is operating properly.

What is claimed is:

1. A method for testing operation of a context-free language compiler, the method comprising acts of:

(a) generating a terminal string based, at least in part, on a grammar description comprising a set of production rules, each production rule comprising a replacement string for a non-terminal symbol, the terminal string comprising one or more instances of at least one terminal symbol;

(b) generating a test string by replacing, with a value, one or more instances of a terminal symbol in the terminal string;

(c) applying the test string to the compiler so that the context-free language compiler produces a response based upon the test string;

(d) determining whether the response matches an expected response for application of the test string;

(e) generating a set of terminal strings by repeating act (a), the set of terminal strings being generated by applying each production rule in the set of production rules at least once; and (f) repeating acts (b), (c), (d) for each terminal string in the set of terminal strings.

2. A method for generating a set of strings for testing operation of a context-free language compiler for a context-free language, the method comprising acts of:
   (g) generating a terminal string based, at least in part, on a grammar description for the context-free language comprising a set of production rules, each production rules comprising a replacement string for a non-terminal symbol, the terminal string comprising one or more instances of at least one terminal symbol;
   (h) generating a test string by replacing, with a value, one or more instances of a terminal symbol in the terminal string;
   (i) generating an invalid terminal string based on at least one valid production rule from the set of production rules and at least one invalid production rule from a set of invalid production rules, wherein each invalid production rule comprises an invalid replacement string for a non-terminal symbol, the invalid replacement string is guaranteed to be invalid for the context-free language;
   (j) generating an invalid test string by replacing, with a value, one or more instances of a terminal symbol in the invalid terminal string;
   (k) applying the invalid test string to the context-free language compiler so that the context-free language compiler produces a response based upon the invalid test string; and
   (l) determining whether the response matches an expected response for application of the invalid test string.

3. The method of claim 2, further comprising an act of repeating act (g) until each production rule in the set of production rules has been applied at least once.

4. The method of claim 2, wherein the grammar description comprises flags for influencing the generation of the value of act (h).

5. The method of claim 2, further comprising an act of reading generation options.

6. The method of claim 5, wherein the generation options specify a maximum string length and wherein the terminal string does not have a length greater than the specified maximum string length.

7. The method of claim 2, further comprising an act of reading the set of invalid production rules.

8. The method of claim 5, wherein:
   acts (i) and (j) are performed when the generation options specify that an invalid string should be generated.

9. The method of claim 5, wherein the grammar description comprises:
   a set of non-terminal symbols, wherein one symbol from the set of non-terminal symbols is a start symbol;
   a set of terminal symbols; and
   a set of production rules, each production rule comprising a replacement string for a non-terminal symbol; and
   wherein act (g) comprises acts of:
   (o) generating a working string, the working string comprising the contents of the replacement string for the start symbol;
   (p) when the working string comprises non-terminal symbols, generating a new working string by replacing one or more instances of a non-terminal symbol in the working string with a replacement string for the non-terminal symbol; and
   (q) repeating act (p) using the new working string when the new working string comprises non-terminal symbols.

10. The method of claim 9, wherein the generation options specify a replacement strategy for biasing the selection of a replacement string in acts (o) and (p) when multiple replacement strings exist for the symbol being replaced.

11. A computer-readable device storing computer-readable instructions which, as a result of being executed by a computer, configure the computer to perform a process of generating a set of strings for testing operation of a context-free language compiler, the process comprising acts of:
   (a) generating a terminal string based, at least in part, on a grammar description comprising a set of production rules, each production rule comprising a replacement string for a non-terminal symbol, the terminal string comprising one or more instances of a terminal symbol;
   (b) generating a test string replacing, with a value, one or more instances of a terminal symbol in the terminal string; and
   (c) applying the test string to the context-free language compiler so that the context-free language compiler produces a response based upon the test string;
   (d) determining whether the response matches an expected response for application of the test string;
   (e) generating a set of terminal strings by repeating act (a) until each production rule in the set of production rules has been applied at least once; and
   (f) repeating acts (b), (c), (d) for each terminal string in the set of terminal strings.

12. The computer-readable device of claim 11, wherein the grammar description comprises flags for influencing the generation of the value of act (b).

13. The computer-readable device of claim 11, further comprising instructions for performing an act of reading generation options.

14. The computer-readable device of claim 13, wherein the generation options specify a maximum string length and wherein the terminal string does not have a length greater than the specified maximum string length.

15. The computer-readable device of claim 13, further comprising instructions for performing an act of reading a set of invalid production rules, each invalid production rule comprising an invalid replacement string for a non-terminal symbol.

16. The computer-readable device of claim 15, wherein:
   the generation options specify that an invalid string should be generated; and
   the terminal string is generated using at least one of the invalid production rules from the set of invalid production rules.

17. The computer-readable device of claim 13, wherein the grammar description further comprises:
   a set of non-terminal symbols, wherein one symbol from the set of non-terminal symbols is a start symbol;
   a set of terminal symbols; and
   wherein act (a) comprises acts of:
   (g) generating a working string, the working string comprising the contents of the replacement string for the start symbol;
   (h) when the working string comprises non-terminal symbols, generating a new working string by replacing one or more instances of a non-terminal symbol in the working string with a replacement string for the non-terminal symbol; and
   (i) repeating act (h) using the new working string when the new working string comprises non-terminal symbols.

18. The computer-readable device of claim 17, wherein the generation options specify a replacement strategy for biasing the selection of a replacement string in acts (g) and (h) when multiple replacement strings exist for the symbol being replaced.

19. The method of claim 1, wherein act (e) further comprises:
- (g) collecting statistics relating to a frequency that each production rule has been applied to generate terminal strings in the set of terminal strings;
- (h) based on the statistics, reducing a probability of applying a production rule when the production rule has already been applied to generate a terminal string in the set of terminal strings.

20. The computer-readable device of claim 11, wherein act (e) further comprises:
- (g) collecting statistics relating to a frequency that each production rule has been applied;
- (h) based on the statistics, reducing a probability of applying a production rule when the production rule has already been applied.

* * * * *